US011963587B2

(12) United States Patent
Beermann

(10) Patent No.: US 11,963,587 B2
(45) Date of Patent: Apr. 23, 2024

(54) BELT BUCKLE, BELT BUCKLE SYSTEM AND AIRCRAFT SAFETY BELT

(71) Applicant: AIRCRAFT CABIN MODIFICATION GMBH, Memmingen (DE)

(72) Inventor: Andreas Beermann, Memmingen (DE)

(73) Assignee: AIRCRAFT CABIN MODIFICATION GMBH, Memmingen (DE)

( * ) Notice: Subject to any disclaimer, the term of this patent is extended or adjusted under 35 U.S.C. 154(b) by 0 days.

(21) Appl. No.: 17/597,463

(22) PCT Filed: Jul. 1, 2020

(86) PCT No.: PCT/EP2020/068485
§ 371 (c)(1),
(2) Date: Jan. 6, 2022

(87) PCT Pub. No.: WO2021/004848
PCT Pub. Date: Jan. 14, 2021

(65) Prior Publication Data
US 2022/0279902 A1    Sep. 8, 2022

(30) Foreign Application Priority Data

Jul. 8, 2019 (EP) .................................... 19185016

(51) Int. Cl.
*A44B 11/25* (2006.01)
*B60R 22/48* (2006.01)

(52) U.S. Cl.
CPC ...... *A44B 11/2526* (2013.01); *A44B 11/2557* (2013.01); *A44B 11/2569* (2013.01); *B60R 22/48* (2013.01); *B60R 2022/4816* (2013.01)

(58) Field of Classification Search
CPC ............ B60R 22/48; B60R 2022/4816; A44B 11/2569; A44B 11/2557; A44B 11/2526
See application file for complete search history.

(56) References Cited

U.S. PATENT DOCUMENTS 3,029,487 A    4/1962 Asai
3,203,064 A    8/1965 Murphy, Sr.
(Continued)

FOREIGN PATENT DOCUMENTS

EP    3170704    5/2017
JP    3144742 U    9/2008

OTHER PUBLICATIONS

Extended European Search Report regarding corresponding European Patent Application No. 191850163, dated Jan. 15, 2020.
(Continued)

*Primary Examiner* — Robert Sandy
*Assistant Examiner* — Michael S Lee
(74) *Attorney, Agent, or Firm* — Lewis & Reese, PLLC

(57) ABSTRACT

The present invention relates to a belt buckle (10) for a length-adjustable aircraft safety belt, wherein the belt buckle (10) comprises:
a main body (12) which defines a receiving space (20);
a holder (14) for attaching a belt strap (16) of an aircraft safety belt; and
a locking device (18) for latching a buckle tongue on the main body (12) for closing the aircraft safety belt,
wherein the main body (12) comprises a base plate (40) and side cheeks (42) projecting therefrom at two opposite sides, wherein the base plate (40) forms a substantially plane base surface (44), and
wherein the holder (14) is mounted on the side cheeks (42) in a movable manner and a clamping edge (38) of the base plate (40) facing the holder (14) projects from the base surface (44) in the direction of the holder (14), so that the
(Continued)

holder (14) is drawn to the clamping edge (38) when a tensile load is applied to the belt strap (16) and the belt strap (16) is clamped between the clamping edge (38) and the holder (14), so that a length change of the aircraft safety belt is blocked.

15 Claims, 6 Drawing Sheets

(56) References Cited

U.S. PATENT DOCUMENTS

| | | | |
|---|---|---|---|
| 3,242,547 A | 3/1966 | Krengel | |
| 3,246,377 A | 4/1966 | Brown | |
| 3,273,214 A | 9/1966 | Keeling | |
| 3,393,433 A * | 7/1968 | Barcus | A44B 11/2526 24/646 |
| 3,425,103 A | 2/1969 | Melin | |
| 3,494,007 A * | 2/1970 | Dahms | A44B 11/2511 24/637 |
| 4,551,889 A * | 11/1985 | Narayan | A44B 11/10 24/171 |
| 5,088,160 A | 2/1992 | Warrick | |
| 5,138,749 A * | 8/1992 | McCune | A44B 11/2557 24/194 |
| 8,322,000 B2 * | 12/2012 | Dziengowski | A44B 11/2561 24/171 |

OTHER PUBLICATIONS

International Search Report and Written Opinion regarding corresponding PCT Application No. PCT/EP2020/068485, dated Sep. 3, 2020.
Notification of Reason(s) for Refusal regarding corresponding Japanese Patent Application No. 2022-501258, mailed Feb. 20, 2024.

* cited by examiner

BELT BUCKLE, BELT BUCKLE SYSTEM AND AIRCRAFT SAFETY BELT

FIELD OF THE INVENTION

The present invention relates to a belt buckle for an aircraft safety belt, a belt buckle system for an aircraft safety belt and an aircraft safety belt.

INTRODUCTION

Aircraft safety belts are essential components of aircraft seats in civil aviation. In particular in passenger aircrafts it is compulsory that it is possible for passengers to buckle up at their respective seat. Thus, injuries during turbulences and accidents may be avoided or reduced. In this regard, there are high load demands on the aircraft safety belt and particularly its belt buckle. For example, they must be configured for a force of up to 13 kN. At the same time, however, it is important that the weight of the aircraft safety belts is as low as possible. Only this allows an efficient operation of a passenger aircraft. For example, a belt buckle of an aircraft safety belt should not exceed a weight of approx. 80 g.

Furthermore, it is required that aircraft safety belts may be adapted to the size of the respective passengers which they should retain. For example, respective passengers may have different abdominal girths, wherein the aircraft safety belt should nevertheless abut against the buckled-up passenger as precisely as possible without any play. Therefore, in aircraft safety belts normally at least one length of an end of the aircraft safety belt is adjustable. For this purpose, for instance a belt buckle may be shifted along a belt strap in order to adjust its position. Alternatively, this may also be understood such that the belt strap may be shifted along the belt buckle. Thus, it is possible to change a distance between the belt buckle and a seat mounting of the belt strap at which the belt buckle is retained.

Also in this connection there may be quite contrasting demands on the aircraft safety belt and its belt buckle. On the one hand it is desired that the length of the aircraft safety belt is adjustable as quickly and easily as possible in order to increase the comfort and the passengers' acceptance of buckling up. However, because of the optionally occurring high loads on the aircraft safety belt it is at the same time required that, with the length of the aircraft safety belt being adjusted, the belt buckle and the belt strap safely remain in their respective position relative to one another even in case of high loads.

U.S. Pat. No. 5,088,160 discloses, for example, a belt buckle for an aircraft safety belt having an adjustable length. It is suggested therein to provide a plurality of rounded edges for safely clamping a belt strap in an adjusted position. However, a holder for holding the belt strap on the belt buckle, which is complicated, heavy and involves high manufacturing costs, is necessary for this purpose.

SUMMARY

It is an object of the present invention to improve a belt buckle for an aircraft safety belt, a belt buckle system and an aircraft safety belt. In particular, it is an object of the present invention to create a belt buckle which is light, simple and cost-efficient and by means of which a length-adjustable aircraft safety belt may be provided.

In accordance with the invention, this object is achieved by the respective subject-matter of the independent claims. Advantageous embodiments with purposeful developments of the invention are indicated in the respective sub-claims, wherein advantageous embodiments of an aspect are to be considered as advantageous embodiments of respective other aspects and vice versa.

A first aspect of the invention relates to a belt buckle for an aircraft safety belt. The belt buckle may comprise a main body which defines a receiving space for receiving a buckle tongue of the aircraft safety belt at least partly. A corresponding buckle tongue may be inserted into the receiving space for closing the safety belt. The receiving space may also be considered as inner space of the main body, wherein, however, it is preferably not completely closed.

Furthermore, the belt buckle may comprise a holder which is configured to attach a belt strap of the aircraft safety belt by winding it around it. A length of the aircraft safety belt is preferably adjustable by shifting the belt strap on the holder. For example, the holder may comprise a bar element around which the belt strap is wound at least in parts. The belt strap is held in position on the holder for instance by friction and/or clamping. Due to an adjustability of the length of the aircraft safety belt, a locking, for instance a clamping, of the belt strap on the holder may be released, so that the belt strap may slide along the holder. Then, the belt strap may be locked on the holder, for instance by clamping. Preferably, a clamping of the belt strap on the holder is self-locking. When the aircraft safety belt is closed, a position of the belt strap on the holder is then automatically determined. Only by applying and/or moving the belt buckle, for instance by tilting relative to the belt strap and/or opening the aircraft safety belt, the shiftability and thus the length adjustment becomes possible.

Furthermore, the belt buckle may comprise a locking device which is configured to latch the buckle tongue on the main body in a position being inserted at least partly into the receiving space for closing the aircraft safety belt. This latching is preferably releasable for also being able to reopen the aircraft safety belt. By a latching of the buckle tongue with the belt buckle, a passenger may be buckled up by the aircraft safety belt by closing the same. To this end it is preferably provided that on the belt buckle a belt strap is arranged and also on the buckle tongue a belt strap is arranged, which are respectively connected to the aircraft seat and may retain the passenger due to the connection of belt buckle and buckle tongue.

The main body may comprise a base plate and side cheeks projecting therefrom at two opposite sides, wherein the base plate and the side cheeks limit the receiving space at least partly and the base plate forms a substantially plane base surface. The side cheeks may provide respective mounting points for the holder and/or respective actuating elements of the belt buckle and/or respective latching elements of the locking mechanism. Moreover, the side cheeks may limit the receiving space laterally in such a manner that it may be avoided that the passenger's fingers get squeezed during buckling-up and unbuckling. The base plate is preferably configured to rest on the buckled-up passenger. In this case, in the area of the base surface the base plate may form a support surface facing away from the receiving space. The support surface may be defined as the surface by which the belt buckle rests at least partly on a buckled-up person. In this sense, the base plate may also be understood as limiting the receiving space at the lower side. The base plate may also be understood as being configured plane at least in parts and in this plane part forms the base surface on a side facing the receiving space and forms the support surface on a side facing away from the receiving space. A plane base surface is comfortable, stable and may be manufactured in a cost-efficient manner. Deviations with respect to a plane may be caused by manufacturing and, in the present case, should also be considered as plane. For example, respective side cheeks may be formed by deep drawing from a plane plate, wherein the central part between the side cheeks then forms the base plate. In this case, the base plate may also have a slight bulging in the area of the plane base surface, which, however, clearly differs from the curved transition to the side cheeks.

The holder may be mounted on the side cheeks in a translationally movable manner and a clamping edge of the base plate facing the holder may project from the base surface in the direction of the holder, so that the holder is drawn to the clamping edge when a tensile load is applied to the belt strap and the belt strap is clamped between the clamping edge and the holder, so that a length change of the aircraft safety belt is blocked. Preferably, the tensile load is a tensile load in a direction for retaining a buckled-up passenger in the aircraft seat. Such a construction allows the use of a holder in which no other particular steps, geometries, projections or the like are necessary for a sufficiently high clamping of the belt strap. Thus, a complicated geometry of the holder may be dispensed with. For example, rather a cylindrical element may simply be used as the holder. Nevertheless, a sufficiently large clamping force may be provided due to the projecting clamping edge. The belt buckle thus has a simple structure and is light and cost-efficient. In particular, due to the projection a supporting force or clamping force may be introduced easily into the base plate and thus the main body of the belt buckle. High loads thus may be absorbed easily by a construction that has a simple structure and is light. Moreover, a projecting clamping edge may be manufactured in a simple and cost-efficient manner, in particular by reshaping the base plate.

The length may be changed easily and intuitively by shifting the belt buckle along a longitudinal extension of the belt strap. The side cheeks may be formed to be substantially plane or may also have a contoured shape. The side cheeks preferably project from the base plate or its base surface at approx. a right angle. The side cheeks are preferably substantially parallel to an insertion direction of a buckle tongue into the receiving space and/or limit the latter transversely to the insertion direction. The holder is preferably held on the side cheeks in a manner movable along a longitudinal extension of the belt buckle. The longitudinal extension may correspond to a main extension of the respective side cheeks and/or the insertion direction of the buckle tongue. The receiving space may be an at least partly limited inner space in which the belt strap and the holding device are received at least partly.

The clamping edge preferably projects in the direction of the receiving space and/or in a manner facing away from a support surface of the buckle. In particular, the clamping edge may project from the plane of the base surface. The clamping edge may be formed at a border of a curved and/or angled area of the base plate, which preferably adjoins the area forming the base surface. The direction of the tensile load preferably corresponds to a direction of tension in a normal arrangement of the belt buckle or seat belt on a buckled-up person. In such a position, the belt strap extends preferably substantially as an extension of and/or parallel to the base surface from the receiving space and/or a side facing away from an insertion opening for the buckle tongue away from the belt buckle. The tensile load preferably acts substantially also in this direction.

In a further advantageous embodiment of the belt buckle it is provided that the clamping edge is formed at a through opening in the base plate. Preferably, the belt strap is here guided out of the receiving space of the belt strap and thus is clamped additionally, in particular by a curvature. The belt strap may be curved past the clamping edge and then extend between the support surface and a body of a buckled-up passenger. In its clamping position or in a clamping position of the belt buckle, the belt strap may adjoin the support surface and/or a side of the base plate facing away from the base surface. In a position for shifting or for a length change, the belt strap may in contrast for instance be spaced apart here, wherein this is not urgently necessary. Furthermore, such a construction allows the clamping of the belt buckle to be released easily by tilting the main body relative to the belt strap. This allows the clamping of the belt strap on the belt buckle or the holder to be released easily and intuitively because a direction of the tensile load is changed. In particular, the belt strap thus no longer, or to a lesser extent, draws the holder in the direction of the clamping edge, so that the clamping is released or at least respective clamping forces are reduced. Accordingly, the belt strap may be shifted for adjusting the length of the aircraft safety belt, which is also referred to as seat belt in the present case. The clamping edge preferably limits the through opening and/or is arranged on the latter.

In a further advantageous embodiment of the belt buckle it is provided that the side cheeks and the base plate are formed as one piece. The main body is thus particularly robust. Moreover, the belt buckle thus may be manufactured particularly easily and cost-efficiently.

In a further advantageous embodiment of the belt buckle it is provided that the side cheeks, the base plate and/or the projecting clamping edge are formed of a substantially planar starting part by reshaping, particularly deep-drawing and/or punching. Such a manufacturing process is particularly easy and cost-efficient and preferably may be performed in one single step. In particular, the clamping edge thus may be inserted into the main body particularly easily. The clamping edge is preferably formed simultaneously with the side cheeks so that an additional manufacturing step is dispensed with. Punching is particularly suitable for at the same time forming a through opening on the clamping edge, wherein this through opening has already been described before. To this end, a punching tool may be configured such that it reshapes at the same time also an area in the starting part, for example bends it upwards, for forming the projecting clamping edge. The clamping edge may be formed when punching the through opening on which it is formed, in particular by pressing an area out of the plane of the flat starting part. The base surface of the base plate then may correspond to a non-reshaped area of the starting part. Respective through openings may also be made in different manners, for example by punching or drilling, while the side cheeks are formed by deep-drawing. The clamping edge is preferably deburred and/or rounded in order to avoid damage to a belt pressed against it or clamped on it.

In a further advantageous embodiment of the belt buckle it is provided that the clamping edge is rounded, in particular concavely or convexly. The rounded clamping edge may allow higher clamping forces and/or protection of the belt strap. A convex curvature may avoid a point load, in particular in connection with an adjustment to a corresponding radius of the holder and/or the belt strap wound around it. This may increase the lifetime of the aircraft safety belt or the belt strap. A concave curvature may allow a particularly strong clamping, while the curvature may avoid damage to the belt strap caused by a tensile force and/or by the belt strap rubbing over the clamping edge when the length of the aircraft safety belt is changed.

In a further advantageous embodiment of the belt buckle it is provided that the holder comprises a pin element which is mounted in the respective elongate through openings of the side cheeks in a translationally movable manner. Preferably, one through opening for the pin element is provided per side cheek, in which the respective pin element is received at least partly with opposite end regions. Preferably, these two through openings are arranged opposite to each other coaxially and/or symmetrically. Such a mounting of the pin element may be manufactured easily and cost-efficiently and is moreover very robust. A pin element is furthermore particularly well suited for receiving high forces despite a weight-optimized construction. The pin element is preferably protected against loss, for instance slipping out, at the respective elongate through openings. The two side cheeks are preferably symmetrical with respect to each other, in particular in view of a central plane of the base plate. Likewise, the base plate may be symmetrical with respect to the central plane.

In a further advantageous embodiment of the belt buckle it is provided that a distance of the respective through openings of the side cheeks decreases orthogonally with respect to the base surface along the through opening in a movement direction of the holder towards the clamping edge. Thus, a gradual increase in the core force may be achieved in case of an increased tensile load on the belt strap. This protects the belt strap and allows a safe clamping as well as also an easy releasing of the clamping. Only in case of a maximum load, for instance an accident, may the passenger have difficulties in releasing the clamping, but not in case of normal tensile loads of buckling-up and unbuckling processes. For example, the through openings are inclined relative to a plane that is defined by the base surface. Such an inclination angle preferably lies between 5° and 20°.

In a further advantageous embodiment of the belt buckle it is provided that the holder comprises a sleeve which is slipped on the pin element and is configured such that the belt strap is wound around it. By using the sleeve, a desired radius for the winding of the belt strap may be easily provided. Accordingly, it is easy to adjust a frictional force counteracting an adjustment of the belt strap. This may also be advantageous in view of the self-clamping or self-blocking of the belt strap after adjusting the length of the aircraft safety belt. Moreover, the surface or a material of the sleeve may be gentle to the belt strap, for instance in that a relatively soft and/or smooth plastic material is used. This material may be used for the sleeve because the latter may only be loaded when a pressure is applied. In contrast, the pin element may easily absorb respective acting loads, for instance in that it is made of a relatively stable material such as a metallic material. Moreover, the sleeve may be used for protecting the pin element on the main body or the side cheeks against loss. Thus, additional elements and/or fixing elements, which are further accessible to the passenger, may be dispensed with. Removal of the sleeve may be prevented by the belt strap that is wound around it. For disassembling the belt buckle, in this case for instance first the belt strap must be released from the aircraft seat before it may be withdrawn from the sleeve. Only after this withdrawal of the belt strap may then the sleeve be withdrawn from the pin element and thus the pin element disassembled. The sleeve preferably has a cylindrical surface area around which the belt strap is wound at least in parts and/or which extends between the side cheeks.

In a further advantageous embodiment of the belt buckle it is provided that the sleeve has a groove along its longitudinal extension, in which the pin element is received. The groove, for instance, may extend through a cylindrical surface area of the sleeve. A construction of this kind allows a particularly easy and fast mounting of the belt buckle and is particularly suitable for securing the pin element to the side cheeks.

Alternatively or additionally, the sleeve comprises an axial through opening, in particular a central axial through opening, in which the pin element is received. Thus, the sleeve may be manufactured particularly easily and cost-efficiently and, moreover, may absorb particularly high loads, in particular independent of its rotational orientation relative to its axial longitudinal axis and the pin element.

In a further advantageous embodiment of the belt buckle it is provided that the holder, in particular the pin element and/or the sleeve, extends from one side cheek to the other side cheek of the main body, in particular in a manner spaced apart from the base surface. This construction is particularly robust. Preferably, the pin element may be removed from the through openings in the side cheeks without the sleeve being slipped on, in particular by withdrawing it. When the sleeve is slipped on, the sleeve preferably blocks such withdrawal. The belt strap may secure the sleeve to the pin element by being wound around it, in particular when the pin element is received in the groove in the sleeve.

In a further advantageous embodiment of the belt buckle it is provided that the main body is made of a metallic material, in particular of an aluminum material. This makes the main body robust and it may absorb high loads. An aluminum material allows a particularly light main body and furthermore may be deformed easily to form the projecting clamping edge. Alternatively or additionally, the pin element is made of a metallic material, in particular an aluminum material. Thus, also the pin element is light and robust. A further example of a suitable metallic material is steel, which allows even higher loads to be absorbed than an aluminum material. Alternatively or additionally, the sleeve is made of a plastic material. Thus, the sleeve may be particularly light and protect the belt strap from damage caused, in particular, by friction.

In a further advantageous embodiment of the belt buckle it is provided that the locking device comprises a plate element, which is mounted in a swiveling manner between the side cheeks on them, and a latching element attached thereto, which may engage in a corresponding through opening of the buckle tongue in order to lock it with the main body in its position being inserted at least partly in the receiving space for closing the aircraft safety belt. Thus, it is possible to provide a mechanism which allows the aircraft safety belt to be opened and/or closed easily, intuitively and quickly. The locking device is thus also light and robust. The locking device is preferably biased in its locking position by a spring element mounted on the main body. Thus, it may be avoided that the seat belt remains open in an undesired manner. The belt or the belt buckle may be opened by simply drawing the plate element and thus swiveling it relative to the main body. The plate element also limits the receiving space so that the respective users may be protected from being squeezed. The plate element may preferably limit a side of the receiving space facing away from the buckled-up passenger, which is also referred to as upper side. The plate element is preferably aligned in a position biased by the spring element essentially parallel to the base surface of the base plate. Preferably, the plate element is substantially plane and/or made of a metallic material.

In a further advantageous embodiment of the belt buckle it is provided that the belt buckle comprises a sensor assembly with a sensor for detecting a state of closure of the aircraft safety belt and optionally a transmitter for transmitting the detected state of closure and/or optionally a power supply for operating the sensor and optionally the transmitter. This may facilitate the work of the cabin crew. Moreover, it may be guaranteed in dangerous situations that the respective passengers are in fact buckled-up. Moreover, by detecting the state of closure of respective seat belts, possibly unjustified damage claims may be averted, if necessary.

In a further advantageous embodiment of the belt buckle it is provided that the projecting clamping edge introduces a supporting force into the base plate and thus into the main body. In other words, a force caused by the tensile loading of the belt strap and acting on the holder should be introduced into the base plate and thus the main body via the clamping edge on which the holder rests together with the belt strap. In this connection it is preferred that the projecting clamping edge and the movable mounting of the holder on the side cheeks are dimensioned and configured such that at least 80%, preferably at least 90% and particularly preferably the entire force caused by a tensile loading of the belt strap and acting on the holder is absorbed by the projecting clamping edge and introduced into the base plate and thus the main body.

In a further advantageous embodiment of the belt buckle it is provided that the projecting clamping edge defines a support surface for the holder. In other words, the holder, in particular the pin and/or the sleeve of the holder, should be able to rest on the support surface in such a manner that in the clamped state the belt strap is clamped between the support surface and the holder. The support surface is preferably aligned such that in the clamped state the belt strap wound around the holder extends substantially parallel to the support surface. Thus, the force by the load may be distributed over a larger surface of the belt strap so that the latter may not be damaged, for instance, by resting on (and optionally friction with) a sharp edge.

To this end it is also preferred that the support surface comprises a preferably plane or convexly curved surface with an area that actually comes in contact with the belt strap of at least 25 mm2, preferably at least 35 mm2, more preferably at least 40 mm2 and particularly preferably at least 45 mm2. The surface of the support surface preferably has a width of at least 0.5 mm, more preferably at least 0.8 mm and particularly preferably at least 1.0 mm.

In a further preferred embodiment of the belt buckle it is provided that the support surface has a preferably plane surface which encloses an angle with the base plate which lies between 10° and 50°, preferably between 15° and 40° and particularly preferably between 20° and 30°. Thus, the force on the holder, which is acting obliquely downwards with respect to the base plate, may be absorbed particularly well because a preferably plane surface is formed for supporting the holder. For the force acting on the projecting clamping edge not leading to the clamping edge being bent, it is further preferred that the projecting clamping edge defines, at its end facing towards the holder, an extension direction (for instance through a tangent adjacent thereto or though the extension of the central axis) which encloses an angle with the base plate which lies between 40° and 80°, preferably between 50° and 75° and particularly preferably between 60° and 70°.

A second aspect of the invention relates to a belt buckle system comprising a belt buckle according to the first aspect of the invention and a belt strap which is wound around the holder of the belt buckle and preferably guided out of the receiving space of the belt buckle through the through opening past the clamping edge. Since the belt strap is wound around the holder, it is fastened thereto. The belt buckle system according to the second aspect of the invention thus comprises a belt buckle according to the first aspect. The features and advantages resulting from the belt buckle according to the first aspect may be taken from the description of the first aspect, wherein advantageous embodiments of the first aspect should be considered as advantageous embodiments of the second aspect and vice versa.

A third aspect of the invention relates to an aircraft safety belt with a belt buckle according to the first aspect of the invention and/or a belt buckle system according to the second aspect of the invention and with a buckle tongue, preferably with a belt strap attached to the belt buckle and a belt strap attached to the buckle tongue. The respective facing-away ends of the belt strap are preferably configured to be attached to an aircraft seat. Also a continuous belt strap may be used, which is attached to a belt buckle and a buckle tongue with its respective ends. In this case the belt strap may be attached, for instance, with a central area to the aircraft seat. The buckle tongue may be made, for instance, of a metallic material, preferably an aluminum material, and/or comprise a through opening for an engagement of the latching element of the locking mechanism of the belt buckle. The buckle tongue may be configured, for instance, as a plane element and comprise a further through opening for attaching the corresponding belt strap.

The aircraft safety belt according to the third aspect of the invention thus comprises a belt buckle according to the first aspect and/or a belt buckle system according to the second aspect. The features and advantages resulting from the belt buckle according to the first aspect and the belt buckle system according to the second aspect may be taken from the description of the first aspect and the second aspect, respectively, wherein advantageous embodiments of the first aspect and the second aspect should be considered as advantageous embodiments of the third aspect and vice versa.

Further advantages, features and details of the invention may be taken from the following description of a preferred embodiment as well as from the drawings. The features and combinations of features which are mentioned above in the description as well as the features and combinations of features which are mentioned in the following description of the Figures and/or are shown solely in the Figures may be used not only in the respective mentioned combination but also in other combinations or uniquely without leaving the scope of the invention.

DETAILED DESCRIPTION

Figure 1:
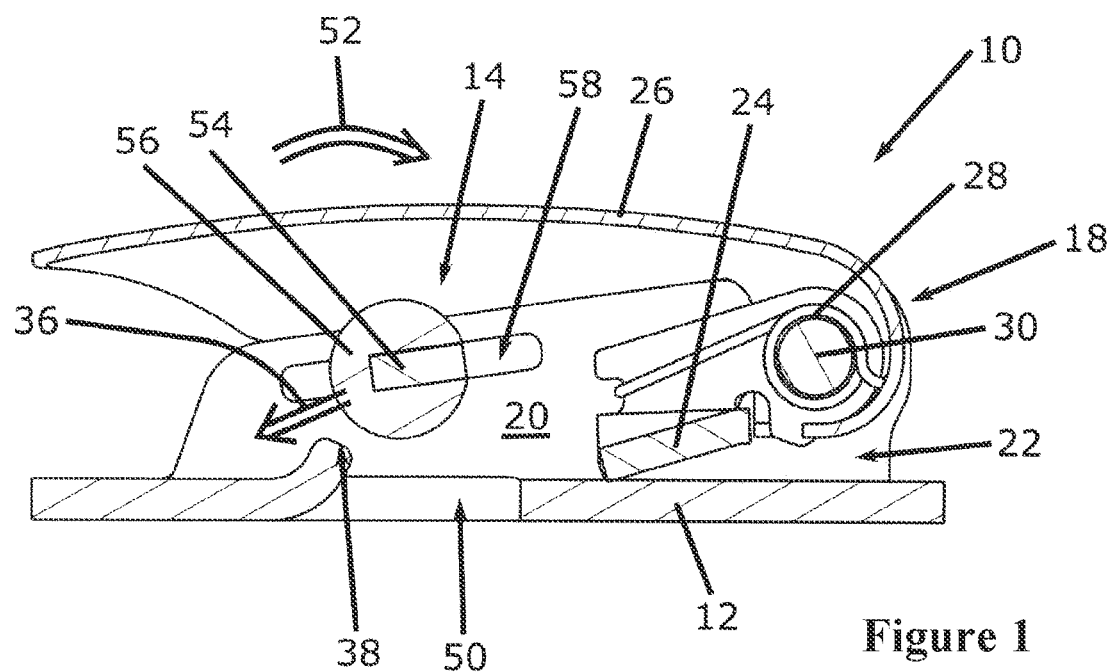
FIG. 1 shows a belt buckle for an aircraft safety belt with a holder for attaching a belt strap in a schematic sectional view.
Figure 3:
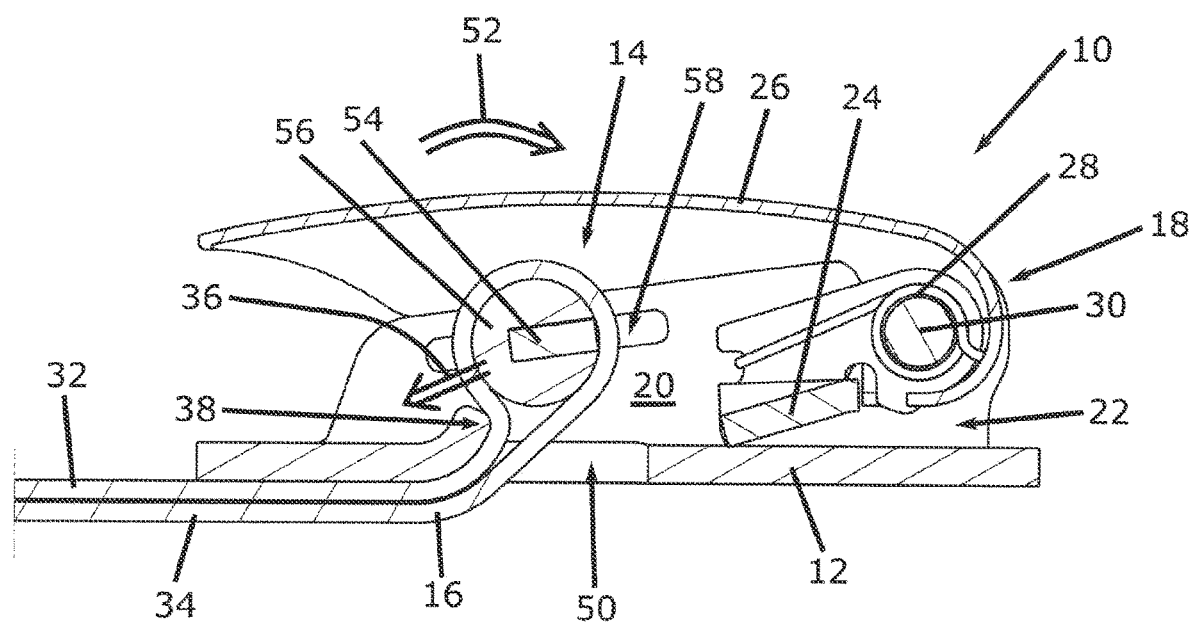
FIG. 3 shows the belt buckle according to FIG. 1 with a belt strap attached thereto in a schematic sectional view.

FIG. 1 shows a belt buckle 10 for an aircraft safety belt in a schematic sectional view. The belt buckle 10 comprises a main body 12 which is shown in an isolated manner without further parts in a schematic perspective view in FIG. 4. The belt buckle 10 further comprises a holder 14 which is configured to attach a belt strap 16 of the aircraft safety belt by the belt strap being wound around it. In FIG. 3 the belt strap 16 is shown in a manner wound around the holding device 14 in a sectional view being identical to FIG. 1. The belt buckle 10 further comprises a locking device 18 which is configured to close the aircraft safety belt by latching with a buckle tongue.

Figure 2:
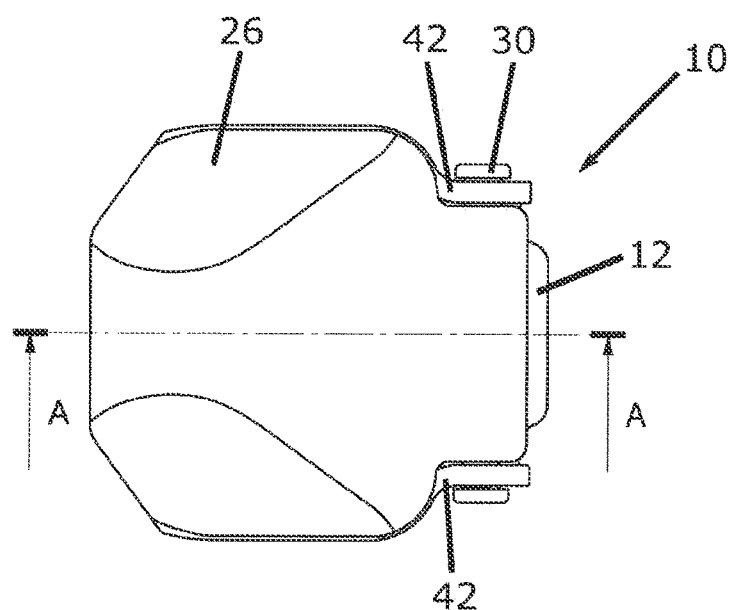
FIG. 2 shows the belt buckle according to FIG. 1 in a schematic top view.

FIG. 2 shows the belt buckle 10 according to FIG. 1 in a schematic top view and illustrates the section of FIG. 1 by the dashed line A-A. The main body 12 defines a receiving space 20 for receiving a buckle tongue of the aircraft safety belt at least partly. For closing the aircraft safety belt, the buckle tongue may be inserted through an opening 22 into the receiving space 20. After insertion of the buckle tongue, a latching element 24 of the locking device 18 latches with a corresponding through opening in the buckle tongue. For opening the aircraft safety belt, a plate element 26 may be lifted and swiveled about a mounting axis 30. Thus, also the latching element 24 is lifted out of the through opening of the buckle tongue and the buckle tongue may then be withdrawn from the receiving space 20. Both the plate element 26 and the latching element 24 are biased by a spring element 28 in a locking position so that the buckle tongue may not be removed unintentionally or the aircraft safety belt may not or only unlikely be opened unintentionally.

In order to be able to adapt the aircraft safety belt to passengers having different sizes, the belt strap 16 may be shifted along its longitudinal extension relative to the belt buckle 10 or the holder 14. For example, an upper end 32 of the belt strap 16 may be drawn for shortening a length of the aircraft safety belt even in case the safety belt is closed. This upper end 32 may also be referred to as free end of the belt strap 16. A lower end 34 of the belt strap 16, however, is preferably connected to an aircraft seat for being able to retain the buckled-up passenger therein. When drawing the upper end 32, the other end 34 is apparently shortened. Vice versa, it is also possible to draw the belt buckle 10 so that the upper end 32 slides in the direction of the aircraft seat and the aircraft safety belt is accordingly adjusted longer.

In the belt buckle 10 it should be possible to adjust a length of the aircraft safety belt easily and intuitively and, moreover, the belt strap 16 should remain safely locked on the belt buckle 10 in the adjusted position. Only in this manner may respective high forces for retaining the buckled-up passenger be absorbed safely. At the same time the belt buckle 10 should be robust, cost-efficient and light.

In the present case the holder 14 is, for this purpose, mounted on the main body 12 in a translationally movable manner. When drawing the belt strap 16, in particular the end 34 connected to the aircraft seat, the holder 14 is drawn in a direction shown by the arrow 36. Moreover, a clamping edge 38 facing the holder 14 projects from a base surface of a base plate of the main body 12. When a tensile load is applied to the belt strap 16, the holder 14 is thus drawn to the clamping edge 38 and the belt strap 16 is clamped between the clamping edge 38 and the holder 14. Thus, a change in the length of the aircraft safety belt is safely blocked and the belt strap 16 is locked in its position on the belt buckle 10. In particular, the clamping is increased due to this construction when the tensile load is increased, so that a change in length with little force does not conflict with a reduction in the holding during high tensile forces which may occur during an accident.

Figure 4:
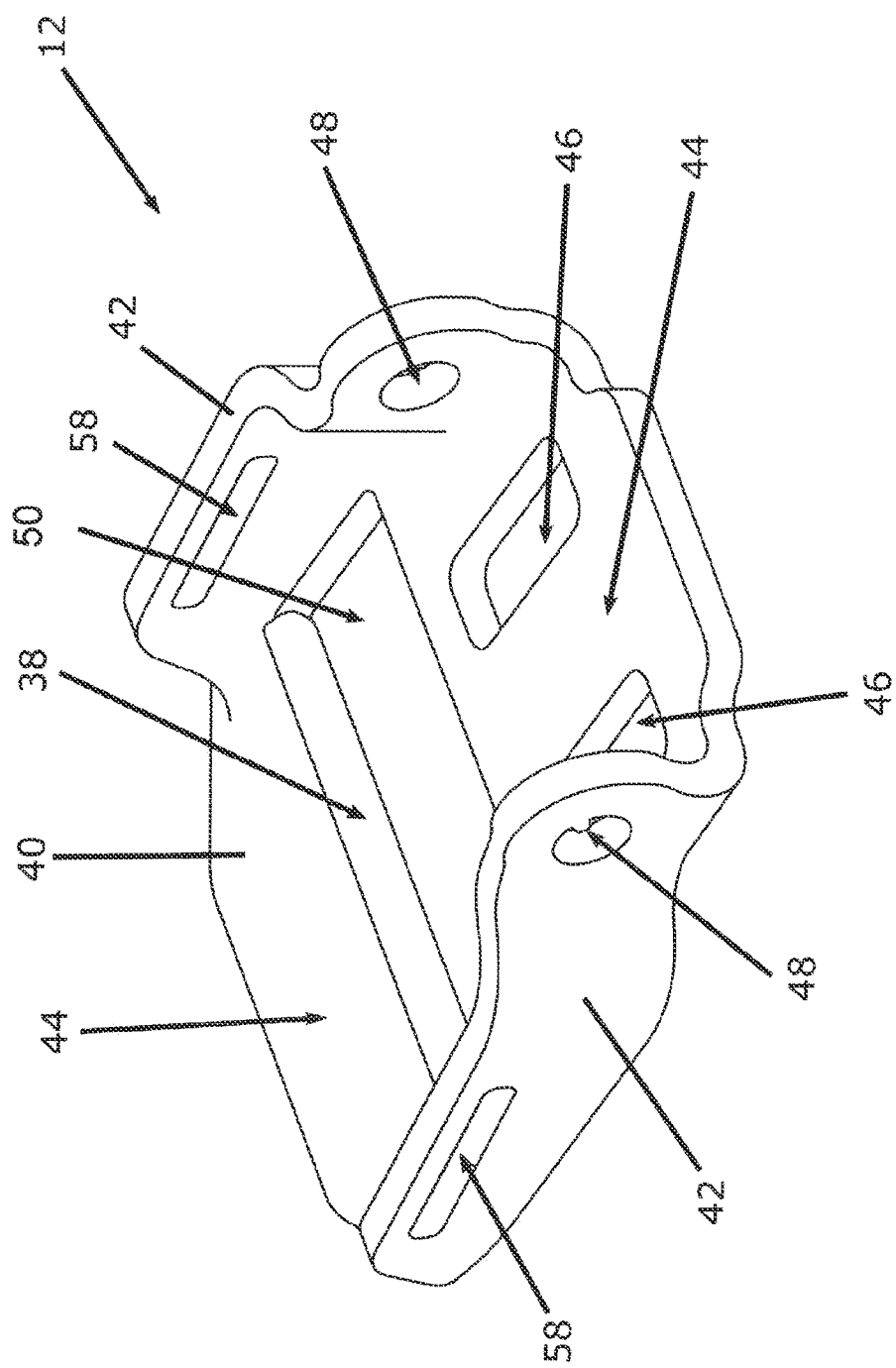
FIG. 4 shows a main body of the belt buckle according to FIG. 1 in a schematic perspective view.

In the following the exemplary construction of the main body 12 is explained on the basis of the schematic perspective view of FIG. 4, which allows a construction of the belt buckle 10 which is particularly simple, robust and may be manufactured in a cost-efficient manner. The main body 12 comprises a base plate 40 and, at two opposite sides thereof, side cheeks 42 projecting from it at a right angle. The base plate 40 and the side cheeks 42 limit the receiving space 20 at least partly. Moreover, the base plate 40 forms a substantially plane base surface 44 whose side facing away from the receiving space 20 serves as a surface resting on a body of the buckled-up passenger. In a front end facing the opening 22 for inserting the buckle tongue, the base plate 40 comprises two through openings 46. These through openings 46 serve for reducing the weight. Moreover, the side cheeks 42 comprise two opposite through openings 48 in which the mounting axis 30 of the plate element 26 is held.

Furthermore, the base plate 40 comprises a through opening 50 in a central area, which extends through the base surface 44 in the area of the holder 14 and/or its mounting on the side cheeks 42. As evident from FIG. 3, the belt strap 16 is guided through the through opening 50. Moreover, the border limiting the through opening 50 and facing towards the opening 22 for inserting the buckle tongue forms the clamping edge 38. By a rotation of the belt buckle 10 about a longitudinal axis of the holder 14, as shown in FIGS. 1 and 3 by arrows 52, an adjustment of the belt strap 16 relative to the clamping edge 38 or the holder 14 may be changed. When the belt buckle 10 has been tilted far enough, the holder 14 is no longer, or at least to a lesser extent, drawn in the direction of the clamping edge 38 when a tensile load is applied to the belt strap 16. Accordingly, the clamping of the belt strap 16 may thus be released and the latter may be adjusted easily. In particular, such a rotation of the belt buckle 10 may also be caused by drawing the plate element 26 for opening the belt buckle 10. The aircraft safety belt may thus be elongated automatically during opening so that the next passenger may easily attach it even if he/she has a different size.

Figure 7:
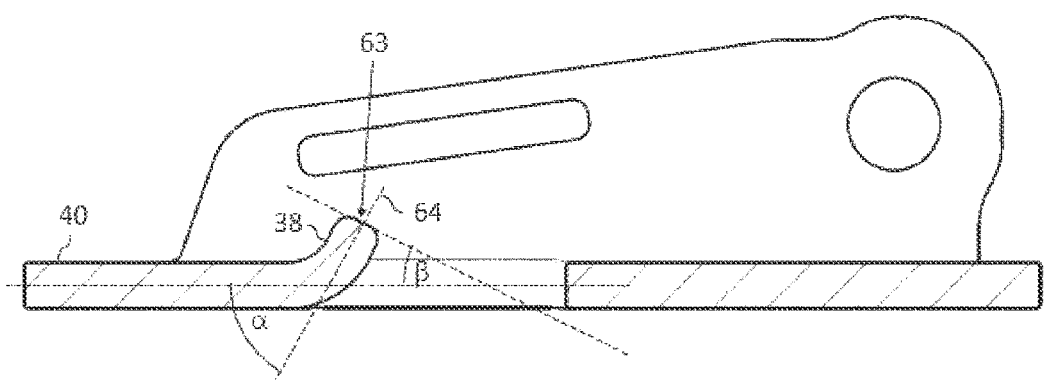
FIG. 7 shows a detail of the belt buckle according to FIG. 1 in a schematic sectional view.

As evident, in particular, from FIGS. 1 and 3, the clamping edge 38 projects from the plane base surface 44 in the direction of the receiving space 20 and the holder 14. The clamping edge 38 thus forms a kind of elevation on the base plate 40 or relative to the base surface 44. In the present case the clamping edge 38 is formed by a curved or angled end region of the base plate 40. In the present case the curved or angled end region is curved or angled relative to the adjoining base surface 44. This is particularly well visible in the detailed view of FIG. 7. According thereto, the support surface 63 of the clamping edge 38 has a plane surface which encloses an angle β with the base plate 40 which is preferably between 10° and 50°, preferably between 15° and 40° and particularly preferably between 20° and 30°. Thus, the force which is acting on the holder obliquely downwardly relative to the base plate (see the arrow in FIG. 1) may be absorbed particularly well because a plane support surface is formed. For the force acting on the projecting clamping edge 38 not causing the clamping edge 38 to be bent, it is furthermore preferred that, at its end facing the holder 14, the projecting clamping edge 38 defines an extension direction 64 (in FIG. 7 through the extension of the center axis) which encloses an angle α with the base plate 40 which is between 40° and 80°, preferably between 50° and 75° and particularly preferably between 40° and 70°.

In the shown configuration of the belt buckle it is provided that the projecting clamping edge 38 defines a support surface 63 for the holder 14. In other words, the holder 14, in particular the pin 54 and/or the sleeve 56 of the holder 14 (see FIG. 5), should be able to rest on the support surface 63 in such a manner that in the clamped state (not yet realized completely in FIG. 3) the belt strap 16 is clamped between the support surface 63 and the holder 14. In this regard, the support surface 63 is preferably aligned such that, in the clamped state, the belt strap 16 wound around the holder extends substantially parallel to the support surface 63. Based on the situation shown in FIG. 3, this state may already be imagined. Thus, the supporting force may be distributed across a relatively large surface of the belt strap, so that the latter may not be damaged by resting on (and optionally friction with) a sharp edge.

The clamping edge 38 in the base plate 40 has multiple advantages. The holder 14 may have a particularly simple construction and may be manufactured cost-efficiently. The clamping edge 38 may be formed integrally with the main body 12. The clamping edge 38 may be manufactured in one manufacturing step, for instance a deep drawing and/or punching process, together with the through opening 50. In particular, a plane starting part may be used, from which the base plate 40 and the side cheeks 42 are formed simultaneously and integrally, preferably together with the through opening 50 and the clamping edge 38, for instance in a combined deep-drawing and punching process. Since the clamping edge 38 projects, a particularly reliable clamping may be caused. Moreover, respective loads which are acting when the buckled-up passenger is retained may be absorbed particularly well, in particular since almost the entire pressure force is acting on the clamping edge 38. These forces may then be introduced particularly well into the remaining main body 12.

In the present case the clamping edge 38 is rounded and deburred. In particular, in the present case the clamping edge 38 is concave so that a particularly strong clamping may be caused. Due to the deburring and rounding, moreover, damage to the belt strap 16 during length adjustment of the aircraft safety belt, for instance by rubbing, may be prevented particularly well.

In the present case the holder 14 comprises a pin element 54 and a sleeve 56. The pin element 54 is shown in an isolated manner in FIG. 5 in a schematic perspective view. A shape of the pin element 54 corresponds to two opposite elongate through openings 58 in the two side cheeks 42. Thus, the pin element 54 may slide to and fro in these two elongate through openings 58 along their longitudinal extension in order to cause or release a clamping of the belt strap 16. The elongate through openings 58 are inclined relative to the plane of the base surface 44 in such a manner that the holder approaches the clamping edge in a direction orthogonal to the base surface 44 upon shifting in a plane of the base surface 44 towards the clamping edge 38 also in this direction. This may cause progressive clamping. The longitudinal extension of the through openings 58 is thus inclined relative to the base surface 44. In the present case the pin element 54 is made of a metallic material, analogously to the main body 12. Preferably an aluminum material is used for reasons of weight.

The sleeve comprises a groove 60 which extends along its axial extension and in which the pin element 54 may be arranged. The sleeve 56 is shown in an isolated manner in FIG. 6 in a schematic perspective view. In contrast thereto, the arrangement of the sleeve 56 on the pin element 54 is shown in FIGS. 1 and 3. In the present case, the sleeve 56 is made, for instance, of a plastic material. This may reduce abrasion of the belt strap 16 during length adjustment, so that the lifetime of the aircraft safety belt may be particularly high. Moreover, the weight of the belt buckle 10 may thus be particularly low, without the occurrence of any stability losses. Respective pressure forces acting on the sleeve 56 may be absorbed well by it even in case a plastic material, which is less robust as compared to metallic materials, is used. As compared thereto, the pin element 54 is made of a more robust material because the pin element 54 must rest on the through openings 58 with a narrow region and here may also be subjected to tensile load and bending. Moreover, the sleeve 56 may be comparatively elastic due to the use of the plastic material, so that a cut in the belt strap 16 at the clamping edge 38 may be avoided reliably even in case very strong forces are acting.

Figure 5:
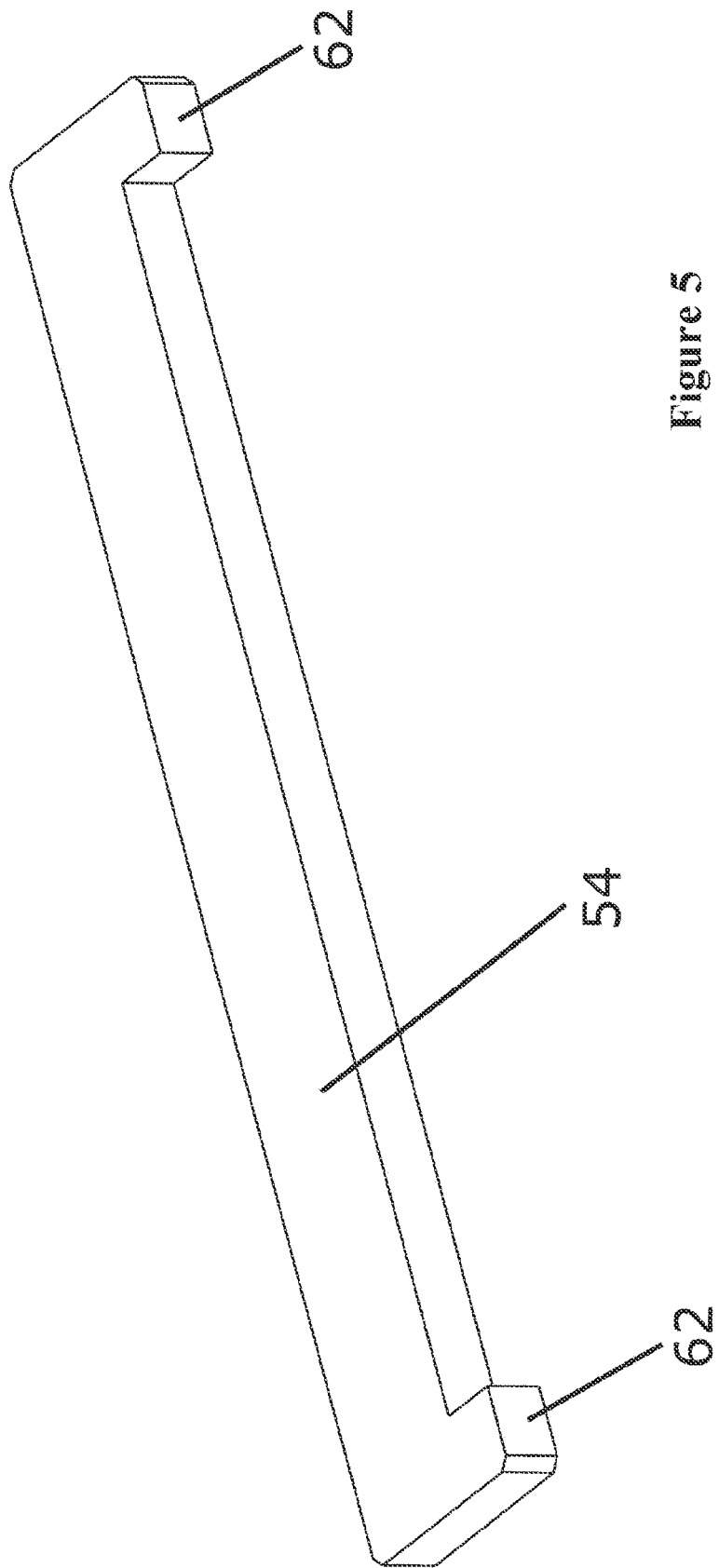
FIG. 5 shows a pin element of a holder of the belt buckle according to FIG. 1 in a schematic perspective view.
Figure 6:
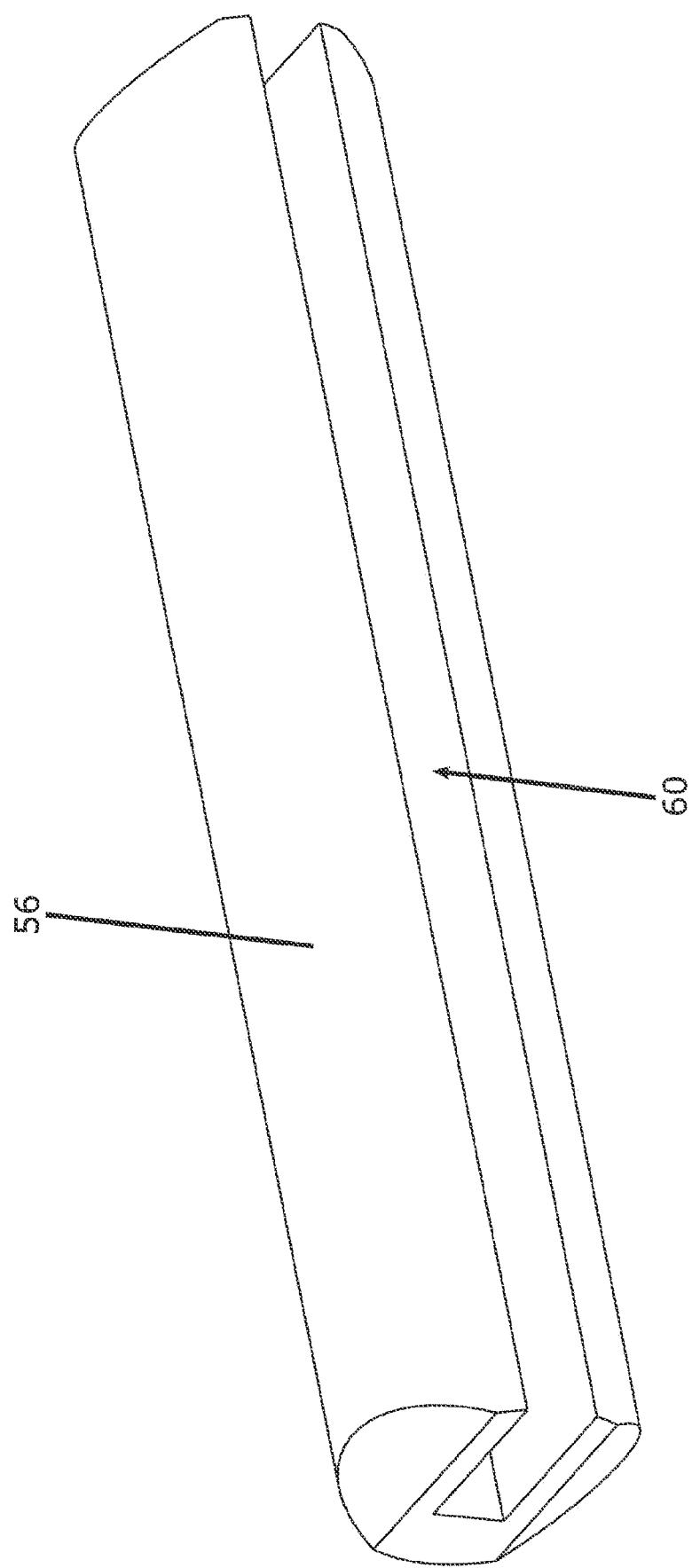
FIG. 6 shows a sleeve of the holder of the belt buckle according to FIG. 1 in a schematic perspective view.

As directly evident from a comparison of FIGS. 5 and 6, the sleeve 56 may simply be slipped on the pin element 54 with the groove 60. In particular, the sleeve 56 may be slipped on the pin element 54 after the pin element 54 was inserted into the through openings 58 on the main body 12 or the side cheeks 42. The two projecting areas 62, which may rest against the groove-free area of the face of the sleeve 56, may prevent the pin element 54 from sliding through the sleeve 56. Thus, the pin element 54 and therefore the holder 14 may be secured to the main body 12. Preferably, a thickness of the sleeve 56 with the belt strap 16 wound around it is so great that the pin element 54 may no longer be moved sufficiently far into the direction of the clamping edge 38 for it to be released from the sleeve 56 and the main body 12, in particular because in such a position the pin element may not yet fit through the elongate through openings 58. The belt strap 16 is preferably also wound around the groove 60 and thus secures the sleeve 56 on the pin element 54. Accordingly, the holder 14 as a whole is co-secured by the belt strap 16. Only after the belt strap 16 has been removed from the belt buckle 10 may the holder 14 be disassembled. Thus, additional securing elements may be dispensed with.

LIST OF REFERENCE SIGNS 10 belt buckle
12 main body
14 holder
16 belt strap
18 locking device
20 receiving space
22 opening
24 latching element
26 plate element
28 spring element
30 mounting axis
32 upper end of the belt strap
34 lower end of the belt strap
36 arrow
38 clamping edge
40 base plate 42 side cheeks
44 plane base surface
46 through opening
48 through opening
50 through opening
52 arrow
54 pin element
56 sleeve
58 elongate through opening
60 groove
62 projecting areas
63 support surface
64 extension direction

The invention claimed is:

1. A belt buckle for an aircraft safety belt, wherein the belt buckle comprises:
a main body which defines a receiving space for receiving a buckle tongue of an aircraft safety belt at least partly, wherein the main body comprises a base plate and side cheeks projecting therefrom at two opposite sides, wherein the base plate and the side cheeks limit the receiving space at least partly and the base plate forms a substantially plane base surface;
a holder comprising a pin element and a sleeve which is slipped on the pin element, wherein the sleeve is configured to attach a belt strap of the aircraft safety belt by the belt strap being wound around it, wherein the pin element is mounted in elongate through openings of the side cheeks in a translationally movable manner, wherein a length of the aircraft safety belt is adjustable by shifting the belt strap on the holder; and
a locking device comprising
a plate element mounted in a swiveling manner about an axis between the side cheeks, and
a latching element attached to the plate element and configured to engage a corresponding through opening of the buckle tongue to latch the buckle tongue on the main body in its position being inserted at least partly in the receiving space, wherein lifting and swiveling the plate element lifts the latching element out of the through opening of the buckle tongue to allow the buckle tongue to be withdrawn from the receiving space,
wherein a clamping edge of the base plate projects from the base surface in the direction of the holder, wherein the holder is drawn to the clamping edge when a tensile load is applied to the belt strap to clamp the belt strap between the clamping edge and the holder, so that a length change of the aircraft safety belt is blocked,
wherein the main body is formed of an aluminum material,
wherein the pin element is formed of a metallic material, and
wherein the sleeve is formed of a plastic material.

2. The belt buckle according to claim 1, wherein the clamping edge is formed at a through opening in the base plate.

3. The belt buckle according to claim 1, wherein the side cheeks and the base plate are formed as one piece.

4. The belt buckle according to claim 1, wherein the side cheeks, the base plate and/or the projecting clamping edge are formed of a substantially planar starting part by reshaping.

5. The belt buckle according to claim 1, wherein a distance of the through openings of the side cheeks decreases orthogonally with respect to the base surface along the through opening in a movement direction of the holder towards the clamping edge.

6. The belt buckle according to claim 1, wherein the projecting clamping edge introduces a supporting force into the base plate and thus into the main body.

7. The belt buckle according to claim 1, wherein the projecting clamping edge and the movable mounting of the holder on the side cheeks are dimensioned and configured such that at least 80% of the force caused by a tensile loading of the belt strap and acting on the holder is absorbed by the projecting clamping edge.

8. The belt buckle according to claim 1, wherein the projecting clamping edge defines a support surface for the holder.

9. The belt buckle according to claim 8, wherein the support surface is aligned such that in the clamped state the belt strap wound around the holder extends substantially parallel to the support surface.

10. The belt buckle according to claim 8, wherein the support surface comprises a plane surface with an area of at least 25 mm².

11. The belt buckle according to claim 8, wherein the support surface has a plane surface having a width of at least 0.5 mm.

12. The belt buckle according to claim 8, wherein the support surface has a plane surface which encloses an angle (β) with the base plate which lies between 10° and 50°.

13. The belt buckle according to claim 1, wherein the projecting clamping edge defines, at its end facing towards the holder, an extension direction which encloses an angle (α) with the base plate which lies between 40° and 80°.

14. A belt buckle system with a belt buckle according claim 1, further comprising the belt strap.

15. The belt buckle system of claim 14, further comprising the buckle tongue attached to the belt strap.

* * * * *